United States Patent Office 3,376,305
Patented Apr. 2, 1968

3,376,305
SYNTHETIC HERNANDIA ALKALOID
Michael P. Cava, Detroit, Mich., assignor to Smith Kline & French Laboratories, Philadelphia, Pa., a corporation of Pennsylvania
No Drawing. Filed Mar. 24, 1966, Ser. No. 536,966
1 Claim. (Cl. 260—289)

This invention relates to a new crystalline product of manufacture and more specifically to a new synthetic alkaloid of the plant *Hernandia ovigera*. The synthetic Hernandia alkaloid of this invention has useful hypotensive activity as demonstrated in standard pharmacological test procedures. Thus in pentobarbitalized dogs, doses of 2.5 and 10 mg./kg. administered intravenously lower blood pressure 45 mm. for 3 minutes and 130 mm. for greater than 53 minutes, respectively. The resting blood pressure is also lowered.

The new synthetic Hernandia alkaloid of this invention is called hernandaline and has the following structural formula:

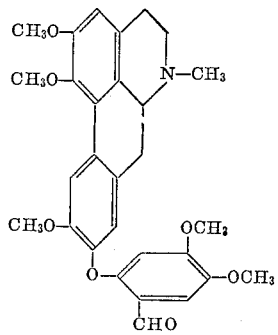

Formula I

Hernandaline is isolated from plant extracts of *Hernandia ovigera* and is advantageously synthesized from N-methyl-laurotetanine as described hereinbelow.

Isolation of Hernandaline from plant extracts

The non-quaternary alkaloidal extract (51.2 g.) from *Hernandia ovigera* is taken up in 500 ml. of benzene and filtered to remove insoluble material. The filtrate is washed with 10% aqueous sodium hydroxide solution, dried and evaporated to dryness. The residue (15.6 g.) is chromatographed on neutral alumina, eluting successively with benzene, benzene-chloroform mixtures and chloroform. The entire eluate is evaporated to dryness and the resulting residue (10.6 g.) is dissolved in benzene. The benzene solution is washed with pH 2.6 buffer solution and then extracted with 1 N hydrochloric acid. Basification of the acid extract with dilute aqueous sodium hydroxide solution gives a suspension which is extracted with chloroform. The chloroform extract is dried and evaporated to dryness to give 2.65 g. of residue which is chromatographed on neutral alumina, eluting successively with (a) 30 ml. of benzene, (b) 40 ml. of 1:9 chloroform-benzene mixture, (c) 40 ml. of 1:1 chloroform-benzene mixture and (d) 20 ml. of chloroform to give corresponding fractions. Fraction (c) and (d) are combined and evaporated to dryness to give 1.8 g. of residue. Crystallization of the residue from 95% ethanol gives 1.1 g. of hernandaline, M.P. 170–171.5° C.

*Analysis.*—Calculated for $C_{29}H_{31}NO_7$: C, 68.91; H, 6.18; N, 2.77. Found: C, 68.66 and 68.83; H, 6.47 and 6.39; N, 3.11 and 3.06. Molecular weight.—Calculated for $C_{29}H_{31}NO_7$: 50.55. Found (by mass spectroscopy): 505. Optical rotation.—$\alpha_D^{25}$ +35.6° (concentration=0.1% in chloroform).

The ultraviolet absorption spectrum of hernandaline exhibits the following characteristic maxima in ethanol:

max. $\lambda$ 216 m$\mu$ (log $\epsilon$ 4.63)
max. $\lambda$ 278 m$\mu$ (log $\epsilon$ 4.40)
max. $\lambda$ 304 m$\mu$ (log $\epsilon$ 4.20).

The infrared absorption spectrum exhibits a characteristic band for carbonyl at the following wave lengths expressed in microns:

5.98 (potassium bromide pellet)
5.97 (chloroform solution).

The nuclear magnetic resonance spectrum afforded the following data:

singlets, 3 protons each: 7.51, 6.28, 6.19 $\tau$
singlet, 9 protons: 6.10 $\tau$
singlets, one proton each: 3.52, 3.35, 3.21, 2.60, 1.80, −0.41 $\tau$.

These physical properties and spectroscopic data indicate the structure of Formula I above for hernandaline. An unambiguous confirmation of the structure is obtained by independent synthesis as follows.

Synthesis of Hernandaline from N-methyllaurotetanine

A mixture of 50 mg. of (+)-N-methyllaurotetanine, 100 mg. of 6-bromoverataldehyde, 30 mg. of copper powder, 70 mg. of pottasium carbonate, 2 mg. of potassium iodide and 1 ml. of pyridine is heated with stirring under nitrogen for 24 hours in an oil bath (120° C.). After cooling, the mixture is dissolved in chloroform, filtered, the filtrate evaporated to dryness and the residue is taken up in benzene. The benzene solution is washed with 10% aqueous sodium hydroxide solution and then extracted with 1 N hydrochloric acid. Basification with dilute aqueous sodium hydroxide solution, extraction of the resulting basic suspension with methylene chloride and evaporation of the organic extract to dryness gives 66 mg. of residue. Column chromatography of the residue on neutral alumina, eluting successively with benzene and 1:9 chloroformbenzene mixture gives 65 mg. of hernandaline. Recrystallization of the synthetic hernandaline from 95% ethanol yields 59 mg. of crystalline material, M.P. 168–169° C. Analysis of the synthetic hernandaline shows it to be identical with natural material in all respects (identical infrared and ultraviolet absorption spectra). The optical rotation of synthetic hernandaline is $[\alpha]_D^{25}$ +33.8° (concentration=0.1% in chloroform).

What is claimed is:
1. Hernandaline, a crystalline product of manufacture, having the structural formula:

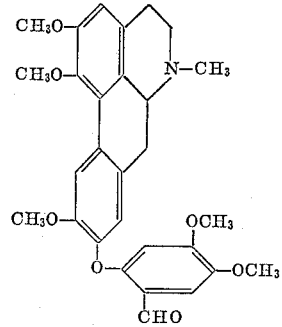

References Cited

UNITED STATES PATENTS 3,131,191   4/1964   Douglas _____ 260—289 X

OTHER REFERENCES

Willaman et al.: "Alkaloid Hunting," Supplemental Table of Genera, USDA ARS–73–1 (1955).

ALEX MAZEL, *Primary Examiner.*

D. DAUS, *Assistant Examiner.*